United States Patent [19]

Jeanrat et al.

[11] Patent Number: 4,524,680
[45] Date of Patent: Jun. 25, 1985

[54] DEVICE FOR RIDDLING BOTTLES ACCORDING TO THE CHAMPAGNE METHOD

[75] Inventors: Roger G. Jeanrat, Ay; Pierre M. Martin, Reuil; Georjes Hardy, Epernay, all of France

[73] Assignee: Methode Champenoise Automatisee-M C.A. G.I.E., Magenta, France

[21] Appl. No.: 604,074

[22] Filed: Apr. 26, 1984

[30] Foreign Application Priority Data

May 11, 1983 [FR] France ............................ 83 07864

[51] Int. Cl.³ ............................................. C12H 1/22
[52] U.S. Cl. .................................. 99/277.1; 414/779; 414/754; 414/782
[58] Field of Search ............ 99/275, 277, 277.1, 99/277.2; 366/208, 209, 215, 216, 217, 219, 233, 235; 414/761, 779, 754, 782, 765

[56] References Cited

U.S. PATENT DOCUMENTS

| 3,533,602 | 10/1970 | Heck | 99/277.2 |
| 3,883,007 | 5/1975 | Hirschboeck | 414/782 |
| 4,324,172 | 4/1982 | Cazals | 99/277.1 |
| 4,356,208 | 10/1982 | Williams | 99/277.2 |
| 4,449,886 | 5/1984 | Kalua | 99/277.2 |

*Primary Examiner*—Robert W. Jenkins
*Attorney, Agent, or Firm*—Robert Scobey

[57] ABSTRACT

A riddling device for processing wine according to the champagne method, with reduced energy expenditure due to a balanced assembly. The device comprises a stand, a cradle capable of pivoting through a right angle relative to the stand, and a platform capable of rotating about an axis disposed in the middle of the cradle. According to the invention the cradle (10) is tilted under the control of a vertical screw (25) and two wheels (8) disposed at its opposite end and running on two slopes (9) on the stand (1).

10 Claims, 13 Drawing Figures

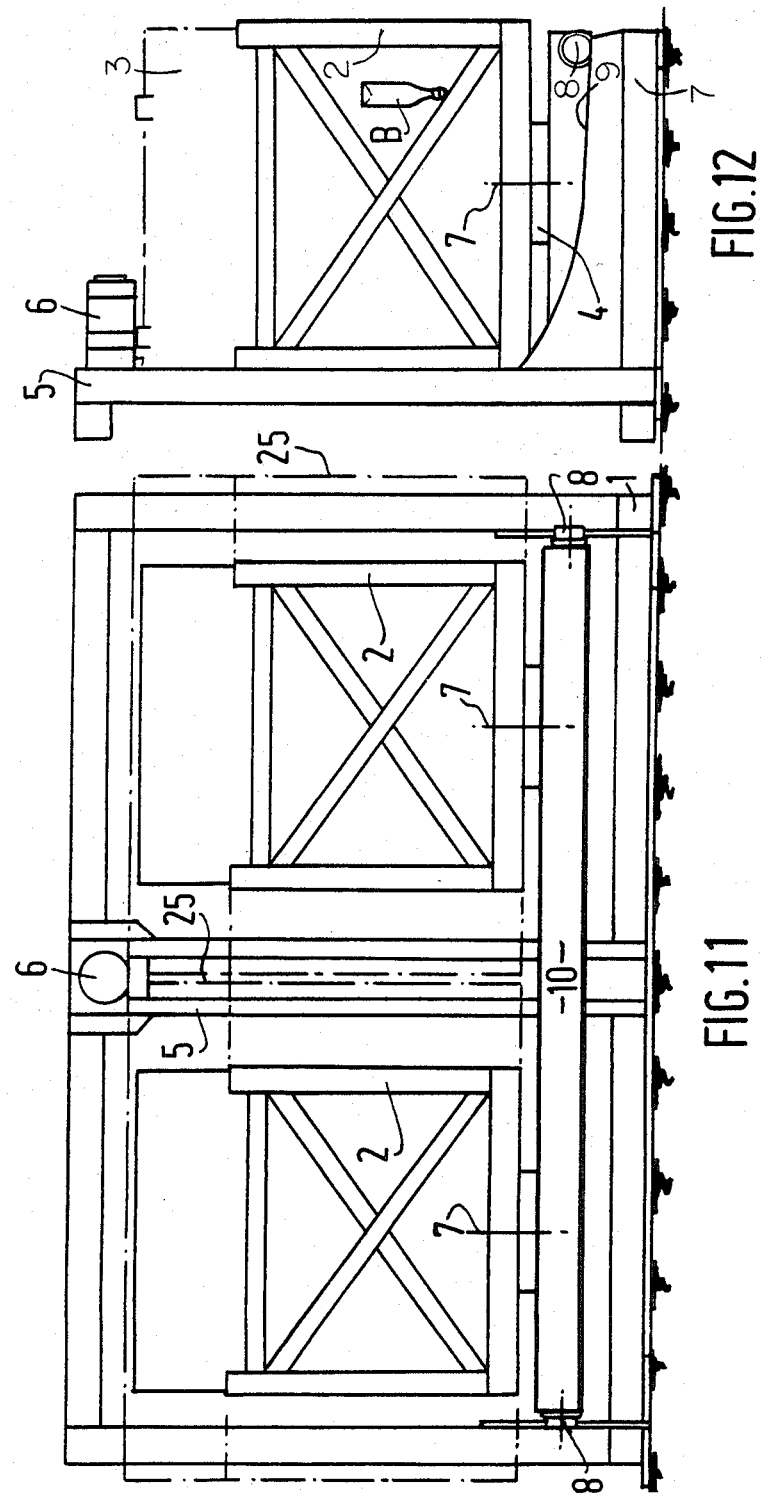

DEVICE FOR RIDDLING BOTTLES ACCORDING TO THE CHAMPAGNE METHOD

The present invention relates to a riddling device for processing wine according to the champagne method. It is known that this method includes a second fermentation stage in the bottle. It is in this stage that the yeast develops to produce sugar and carbon dioxide together with alcohol. Unfortunately, during this stage, dead yeast makes the wine cloudy, whereas the wine must be perfectly clear when drunk.

BACKGROUND OF THE INVENTION

The champagne method thus includes a step known as "riddling" which consists in making the sediment fall into the neck of the bottle by controlled shaking. The sediment is removed from the neck in a subsequent stage known as "disgorging".

The traditional method of riddling consists in putting the bottles in a rack and in raising them progressively from a horizontal or lying position to a vertical position with the neck pointing to the ground. This operation is spread out over a period of several weeks and is expensive. In order to remedy this drawback, French Pat. No. 69 13803 has already proposed riddling a set of bottles simultaneously by means of apparatus suitable for making the set take up the positions necessary for directing the sediment into the bottle neck. However, the apparatus described is manually operated and can only process a small number of bottles.

In order to remedy this drawback, French Certificate of Utility No. 80 00891 proposes an automatically operated device for processing wine according to the champagne method. In this device, the bottles, eg. 500 in number, are inserted in a pallet-crate which is itself inserted into the apparatus. The apparatus comprises a stand on the ground. A chassis or cradle is mounted on the stand and supports a support frame or platform which receives the pallet-crate. The cradle is pivotable about a axis which is movable relative to the stand such that under the action of two side arms it can move from a horizontal position to a vertical position with bottles which were inserted "on slats" finishing the cycle "on their points". Simultaneously with the pivoting, the support frame can rotate about a axis disposed at the middle of the cradle.

In practice, the cradle is driven by two screws disposed horizontally on the stand, with the arms each having one end hinged to the stand and the other end hinged to the cradle causing the support-frame or platform to tilt. The two screws are rotated by an electric motor. The same holds for the support-frame which turns about its central axis under the action of a second electric motor. The set of movements can thus be programmed to limit human intervention to a minimum.

Although the dynamics have been carefully studied, this known device nonetheless suffers from certain drawbacks. The forces that need to be applied are not constant, which leads to rather oversize motors; its bulk is relatively large when the envelope volume of the moving pallet-crate is taken into consideration; the screws are at ground level so one or more bottles breaking can jam the apparatus; and finally it is practically impossible to turn the support-frame in the horizontal position. Given the nature of some wines and of some additives, it can be impossible to obtain satisfactory riddling without an initial rotation in a horizontal plane while the bottles are on slats.

Preferred embodiments of the present invention remedy these drawbacks and substantially improve the quality of the riddling performed.

SUMMARY OF THE INVENTION

The present invention provides a riddling device for processing wine according to the champagne method, the device comprising a stand, a cradle capable of pivoting through a right angle relative to the stand, and a platform capable of rotating about an axis disposed in the middle of the cradle, the platform being suitable for receiving a pallet-crate containing bottles, wherein one of the ends of the cradle is hinged to a moving support which is capable of vertical translation, and wherein the opposite end of the cradle is fitted with two wheels placed to run along slopes on the stand.

As in the prior art, the pallet-crate must pivot through a right angle about its axis. Stiff points during the desired pivoting action can be avoided by seeking an optimum balance. As a result, the forces to be applied are much smaller, which means that the mechanical drive units can be of smaller capacity. Further, the vertical position of the screw makes it possible to reduce the floor space required, which is highly appreciated in cellars since space is limited.

In an advantageous disposition, a single vertical screw is used to move two platforms.

The platform may be constituted by two perpendicular plates, with means being provided to lock a pallet-crate against both plates.

BRIEF DESCRIPTION OF THE DRAWINGS

Embodiments of the invention are described by way of exampll with reference to the accompanying drawings, in which:

FIGS. 11 and 12 are a front view and a side view of the same apparatus, FIG. 12 showing the apparatus at the end of riddling.

MORE DETAILED DESCRIPTION

Figure 1:
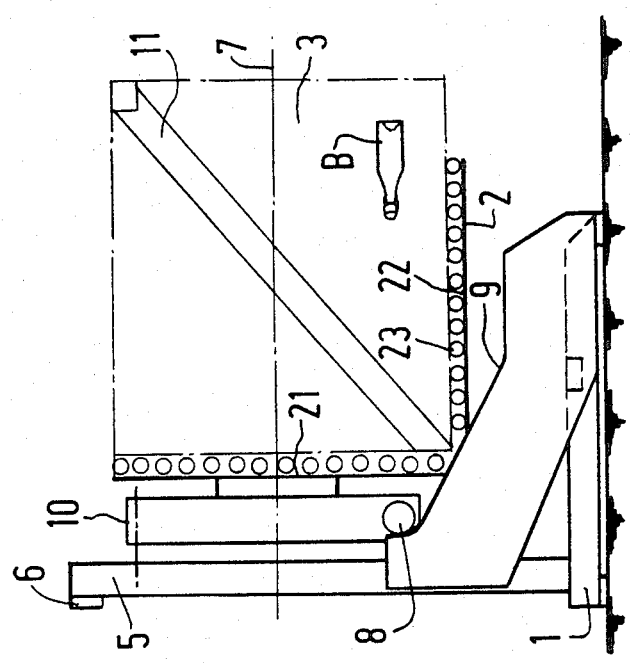
FIG. 1 is a side view of apparatus in accordance with the invention having a platform which is constituted by two perpendicular plates.
Figure 2:
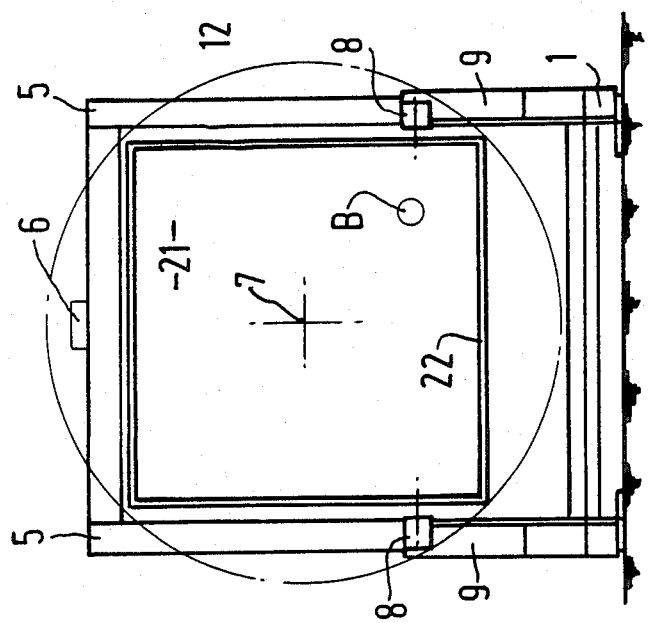
FIG. 2 is a front view of the same apparatus.
Figure 5:
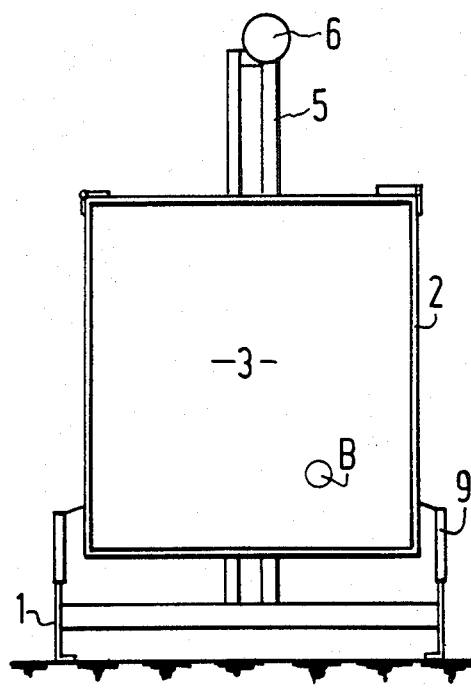
FIG. 5 is a front view of the FIG. 3 apparatus.

FIGS. 1 and 2 show a first embodiment of the invention. The apparatus has a ground-mounted stand 1. The stand comprises a horizontal bed-plate with two vertical columns 5 standing at the sides thereof. A platform 2 constituted by two perpendicular plates 21 and 22 receives a pallet-crate 3 of the type described in French Pat. No. 79 12443, for example. The platform 2 is advantageously fitted with rollers 23 or analogous means on its inside faces. The purpose of the rollers is to enable the pallet-crate 3 to be placed on the platform and to be removed therefrom. This arrangement enables the apparatus to be loaded and unloaded from a conveyor belt, not shown. Naturally, in the case shown where the platform is constituted by two plates, it is necessary to provide retaining means 11 to hold the crate 3 pressed against the platform. This embodiment of a platform greatly facilitates loading since it is not necessary, as with a support-frame, to bring a forklift truck exactly opposite the apparatus, whence considerable saving in space.

Naturally, the platform 2 may also, as is shown below, be constituted by a support-chassis in the form of a cube with one open face, with the crate being inserted through the open face. The platform 2 is mounted on a cradle 10 via a ring 8 in such a manner as to enable the platform, and hence the crate, to rotate about an axis 7 which, in the FIG. 1 position, is horizontal. One of the bottles B inside the crate 3 is shown in the figures so that its changes in position can be followed. The cradle 10 has its top fixed to a guide carriage which is described below, said guide carriage being moved by the rotation of screws contained in the guide columns 5, and said screws being driven simultaneously by one or two motors 6.

A wheel 8 is mounted on each side of the bottom portion of the cradle 10, and co-operates with a slope 9 formed on the stand. These items are also visible in FIG. 2 which further shows a circle referenced 12 delimiting the space occupied by the crate 3 during its movements.

In FIGS. 1 and 2, the device is shown just after being loaded. That is to say the bottles are lying horizontally on slats. An initial riddling action can be performed in this position by turning the platform alternately left and right. Then, under the influence of the motor unit 6, the screws in the columns 5 are rotated, thus lowering the top portion of the cradle. As the cradle is lowered, the wheels 8 run along the slopes 9, thereby tilting the crate. This movement is combined with various rotations of the crate 3 about the axis 7. In order to jolt the wine slightly, small roughnesses may be provided on the ring 4. The means used for obtaining said rotation are identical to those described in Utility Certificate No. 80 00891.

In the above-described example, the cradle is moved under the control of two vertical screws disposed on either side of the stand. In practice, and taking device dynamics into account, it is possible to use only one vertical screw which is then placed in the middle of the back of the apparatus. Such an embodiment is shown in FIGS. 3 to 7. These figures show the same items as have already been mentioned, namely the stand 1, the platform 2, the pallet-crate 3, the ring 4, and the cradle 10 having its bottom resting on the stand via wheels 8 which run along a slope 9.

Figure 3:
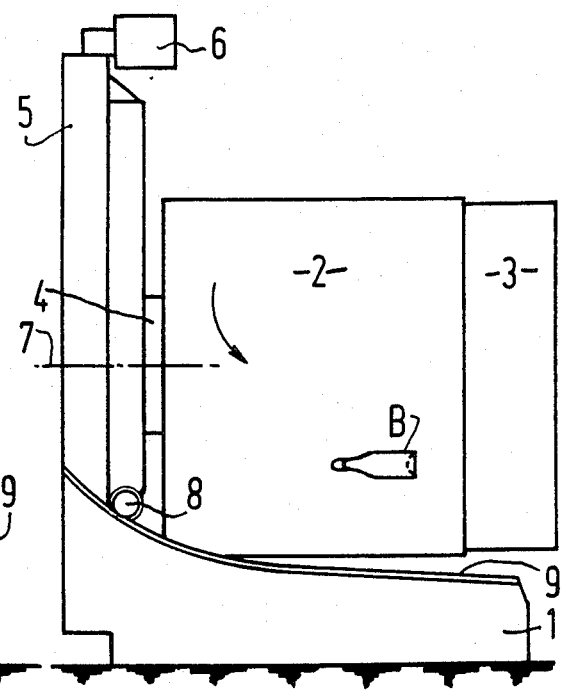
FIG. 3 is a view of a second embodiment of the apparatus having a single screw.
Figure 4:
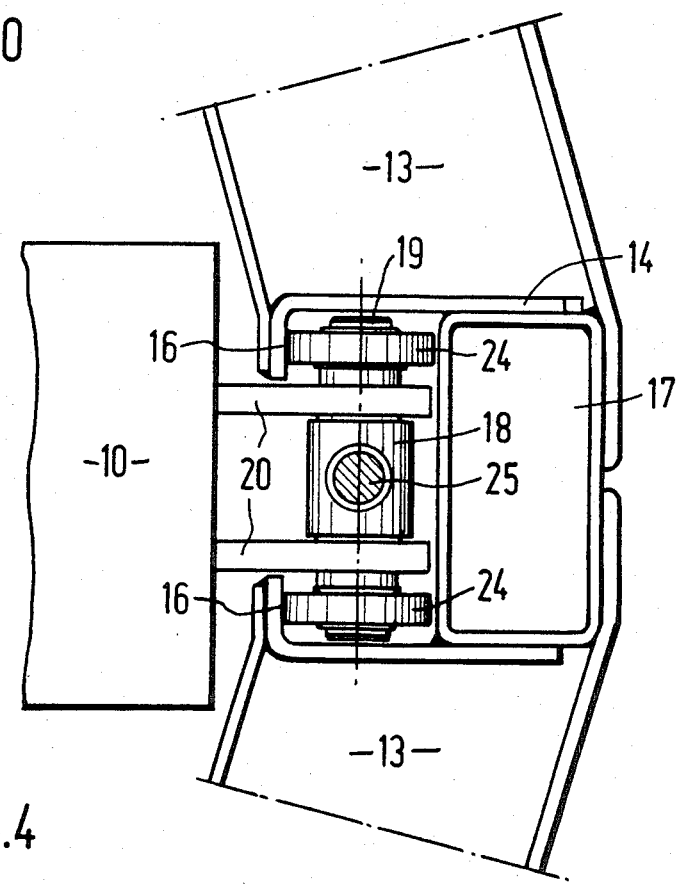
FIG. 4 is a detailed view, to an enlarged scale, of part of the apparatus of FIG. 3.

FIG. 4 is a detailed view of part of the apparatus of FIG. 3. In this embodiment, the stand 1 has two arms 13 which meet in the middle to form a guide column 14. The guide column forms a rectangular cage in which a drive carriage 15 moves between rollways 16 and a box section beam 17. The guide carriage 15 comprises a nut 18 with pins 19 projecting from either side. The pins pass through a bracket 20 which is pivotable thereon and have respective wheels 24 which run in the rollways 16. Rotating the central screw 25 in one direction or the other causes vertical displacement of the nut in one direction or the other, and hence vertical displacement of the top of the cradle, and consequently changes the inclination of the platform 2.

Figure 7:
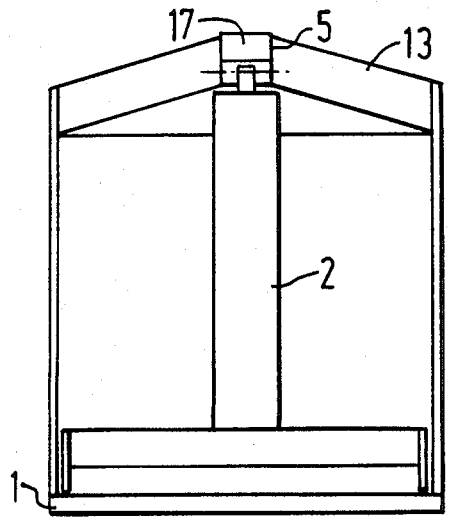
FIG. 7 is a view looking down on the FIG. 3 apparatus.
Figure 6:
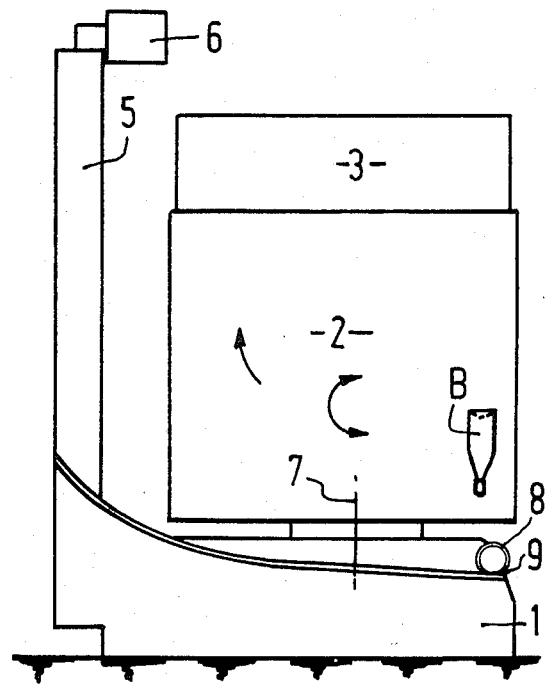
FIG. 6 is an identical view to FIG. 3 at the end of riddling.

FIG. 6 shows the FIG. 3 apparatus after a complete riddling cycle has been completed. The apparatus may be unloaded with the bottles "on their points". As can be seen in FIGS. 4 and 7, the guide column has a box beam 17 on which the wheels 24 run. The beam 17 can advantageously be used to interconnect a plurality of apparatuses intended to operate as a battery, since connection parts can readily be inserted in the hollow box section to obtain horizontal and/or vertical assemblies.

As can be seen in FIGS. 3, 6 and 7, to minimize bulk, the column 5 is stepped back to enable the pallet-crate to rotate about the axis 7 at the various inclinations resulting from the wheels 8 moving along the slope 9.

Another embodiment is shown in FIGS. 8 to 12 in which the space occupied from front-to-back is reduced, ie. there is no longer any need to step back the column 5 in which the guide carriage is supported. In this embodiment, two platforms 2 are mounted on the same stand 1 and the same cradle 10, and they are driven by a single motor 6 which acts on a vertical screw 25 as before. Rotating the screw tilts the crates carried by the platforms by virtue of the wheels 8 bearing on side ramps 9.

Figure 8:
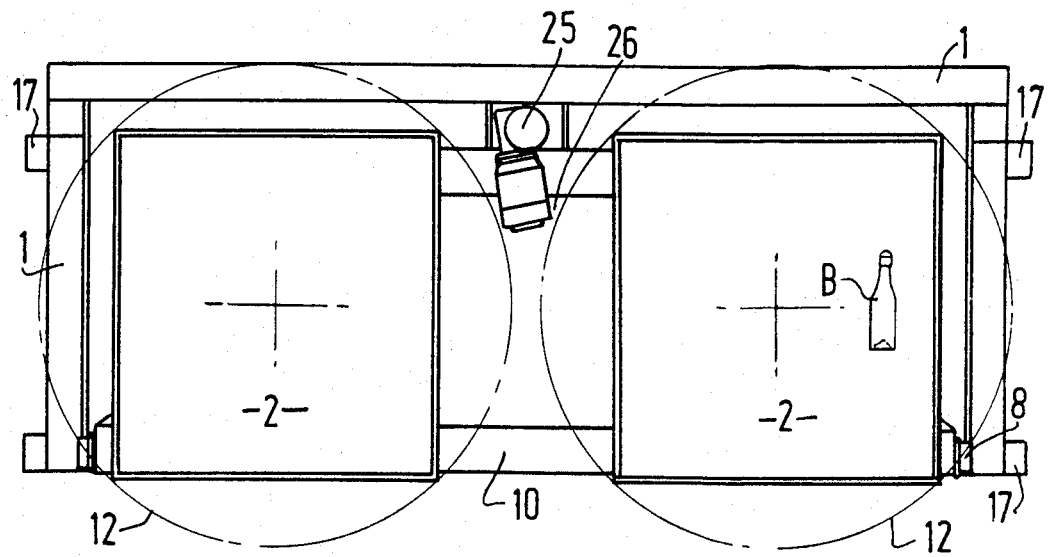
FIG. 8 is a view looking down on apparatus having two pallet-crates.

FIG. 8 is a plan view of the device as seen from above, and the broken line circles 12 show the envelopes within which the pallet-crates are moved. As can be seen clearly in FIG. 8, there is a space 26 between the two envelopes 12 in which a motor and reduction gear unit 6 is disposed in such a manner that it can be completely integrated in the chassis whose front-to-back extent is the same as for the first embodiment. That is to say about 30 cm are gained over apparatuses presently available on the market.

Figure 9:
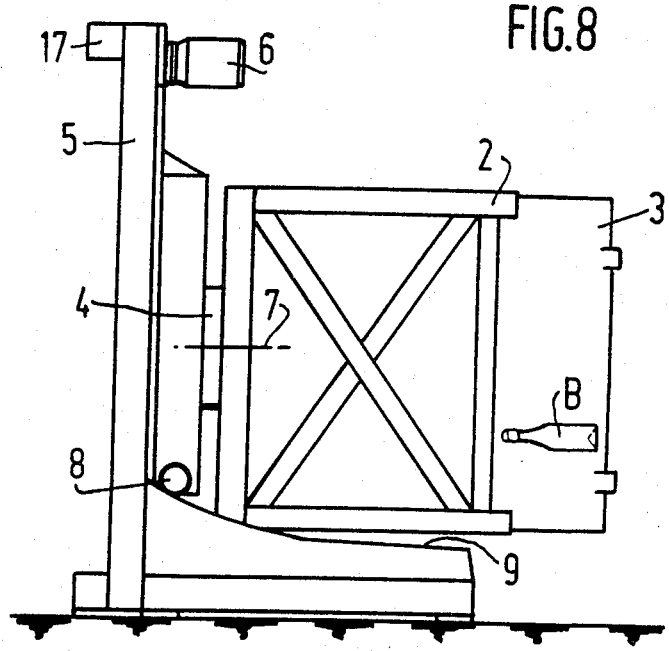
FIG. 9 is a side view of the FIG. 8 apparatus.

FIG. 9 is a side view of the double platform device at the beginning of riddling, while FIG. 12 is the same view at the end of riddling.

Figure 10:
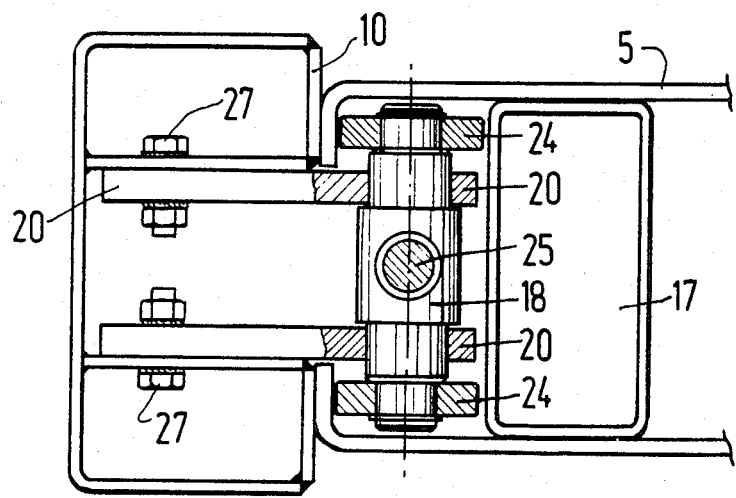
FIG. 10 is a detailed view, to an enlarged scale, of part of the apparatus of FIG. 9.

FIG. 10 is a detailed view of part of the apparatus of FIG. 9. It shows the same items as already mentioned with reference to FIG. 4, and in particular, the central vertical screw, the box beam 17, the core or nut 18 and the bracket 20. In this embodiment, the bracket 20 is bolted by bolts 27 to the cradle 10 which moves along the guide column 5 in such a manner that the overhang is thus reduced. This assembly can also be seen in FIG. 13 which is a vertical section through the guide column.

FIG. 11 is a front view of a two platform device in which the platforms 2 are constituted by support chassis of known type, ie. they are constituted by parallelipipeds having cross-braced faces and one open face. Naturally, since both platforms have their bottom portions interconnected by a common beam 29 with the wheels 8 at its ends, they are always at the same inclination to the horizontal. However, in order to improve the quality of the riddling, their rotary movements about the axes 7 may be desynchronized so that each platform is slightly jolted by the other platfrom rotating.

Figure 13:
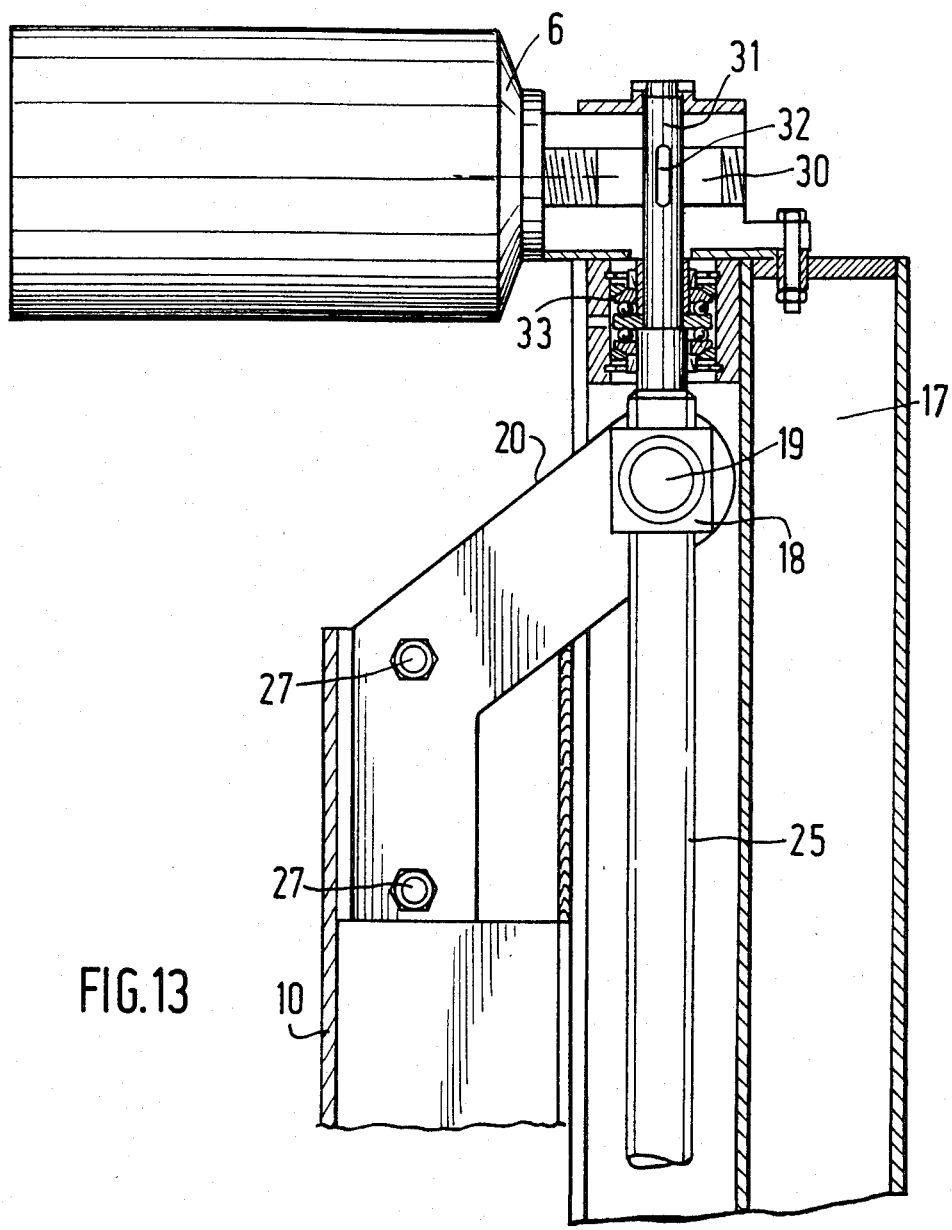
FIG. 13 is a section view through the guide column.

FIG. 13 shows the top of a guide column, and is in partial section. The motor reduction gear unit 6 drives the screw 25 via an endless screw 28 and a toothed wheel 30. The wheel 30 is fixed to the shaft 31 at the end of the screw 25 by means of a key 32. The screw 25 is held against forces tending to move it vertically by a ball thrust plate 33. Any other drive system, eg. a set of bevel gears, could be used instead.

The above description only mentions a screw drive, since such a drive is well adapted to the slow tilting which is desired, however, one of the ends of the cradle could be moved vertically by other means, eg. a hydraulic or a pneumatic jack.

In the above description, the opposite end of the cradle 10 to the column 5 rests on slopes 9 of the stand via wheels 8. In order to improve riddling, the wheels 8 may be mounted on the cradle 10 by an excentric arrangement to give a slightly bumpy ride. Another technique would be to put bumps on the slopes 9.

We claim:

1. A riddling device for processing wine according to the champagne method, the device comprising a stand, a cradle capable of pivoting through a right angle relative to the stand, and a platform capable of rotating about an axis disposed in the middle of the cradle, the platform being suitable for receiving a pallet-crate containing bottles, wherein one of the ends of the cradle is hinged to a moving support which is capable of vertical translation, and wherein the opposite end of the cradle is fitted with two wheels which rest on slopes on the stand.

2. A riddling device according to claim 1, wherein the moving support is moved by rotating a screw inside a vertical guide column which is fixed to the stand and is driven by a motor reduction gear unit.

3. A riddling device according to claim 2, wherein the cradle bears both against the slopes and also against two nuts moving inside two vertical columns disposed on either side of the stand.

4. A riddling device according to claim 2, wherein the guide column is disposed behind the stand in the middle thereof, the column being held by arms.

5. A riddling device according to claim 2, wherein the stand supports a cradle which receives two platforms, the platforms pivoting simultaneously with the cradle, but being capable of rotating independently about respective axes, the guide column being disposed in between the envelopes of the volumes swept by the pallet-crates during riddling in the device.

6. A device according to claim 2, wherein the cradle is slidably mounted on the screw via a core which is fixed between two pins which bear via wheels on a rollway constituted by the guide column, a box beam being mounted inside the column.

7. A riddling device according to claim 2, wherein a motor reduction gear unit for driving the screw is mounted on the stand above the screw.

8. A riddling device according to any one of claims 2 to 5, 6 and 7, wherein the guide column comprises a box section beam suitable for fastening to links for horizontally and/or vertically interconnecting a set of riddling devices.

9. A riddling device according to claim 1, wherein the platform is constituted by two mutually perpendicular plates.

10. A riddling device according to claim 9, wherein the plates are fitted with rollers to facilitate loading pallet-crates onto the platform, and unloading them therefrom.

* * * * *